(12) United States Patent
Grimm

(10) Patent No.: US 7,061,846 B2
(45) Date of Patent: *Jun. 13, 2006

(54) APPARATUS FOR READING FROM OR WRITING TO OPTICAL RECORDING MEDIA HAVING MEANS OF DISK TYPE IDENTIFICATION

(75) Inventor: Michael Grimm, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/930,261

(22) Filed: Aug. 31, 2004

(65) Prior Publication Data
US 2005/0117482 A1    Jun. 2, 2005

Related U.S. Application Data

(62) Division of application No. 09/508,804, filed on Mar. 16, 2000, now Pat. No. 6,807,136.

(30) Foreign Application Priority Data
Sep. 30, 1997    (DE) ............................... 197 43 068

(51) Int. Cl.
*G11B 7/00*    (2006.01)
(52) U.S. Cl. ..................... 369/53.41; 369/53.2
(58) Field of Classification Search ............. 369/53.41, 369/53.2; G11B 7/00, 19/12

See application file for complete search history.

(56) References Cited

U.S. PATENT DOCUMENTS 5,054,013 A    10/1991    Kawamura
5,587,981 A    12/1996    Kamatani
5,721,718 A    2/1998    Hwang
5,724,325 A    3/1998    Jeong
5,909,419 A    6/1999    Kamiyama
6,108,284 A    8/2000    Lee
6,400,660 B1 *    6/2002    Lee et al. ................. 369/44.26

FOREIGN PATENT DOCUMENTS

| EP | 0762393 | 3/1977 |
|---|---|---|
| JP | 63-03471 | 5/1988 |
| JP | 8-36827 | 2/1996 |
| JP | 9-17106 | 1/1997 |

OTHER PUBLICATIONS

Patent Abstracts of Japan Pub. No. 08036827 vol. 096, No. 006, Jun. 28, 1996.
Patent Abstracts of Japan Pub. No. 09017106 vol. 097, No. 005, May 30, 1997.
Patent Abstracts of Japan Pub. No. 63103471 vol. 012, No. 345, Sep. 16, 1988.

* cited by examiner

*Primary Examiner*—A M Psitos
(74) *Attorney, Agent, or Firm*—Joseph J. Laks; Robert B. Levy; Jorge Tony Villabon

(57) ABSTRACT

A device for reading or writing on optical recording media with disk type recognition capability has an optical scanning device and a focus regulating circuit. The arrangement provides rapid and reliable recognition of the recording medium type inserted into the device. A further inventive aspect provides a corresponding process. These inventive aspects are attained by the disk type recognition capability which includes a mirror signal generator, a threshold value generator, a counter and an evaluation unit. The process is based on the utilization of a mirror-signal value of the device for disk type recognition.

7 Claims, 5 Drawing Sheets

US 7,061,846 B2

APPARATUS FOR READING FROM OR WRITING TO OPTICAL RECORDING MEDIA HAVING MEANS OF DISK TYPE IDENTIFICATION

CROSS-REFERENCE TO RELATED APPLICATIONS

This application is a divisional application of U.S. patent application Ser. No. 09/508,804 filed Mar. 16, 2000.

BACKGROUND OF THE INVENTION

1. Field Of The Invention

The present invention relates to an apparatus for reading from and/or writing to optical recording media which has a disk type identification means for identifying the type of recording medium, and also to a corresponding method.

2. Prior Art

An apparatus of this type is disclosed in U.S. Pat. No. 5,414,684. In this known apparatus, in order to identify the type of recording medium an attempt is made to read the list of contents, the so-called TOC or Table of Contents. If it is not possible to read the TOC, then one or a number of attempts are made to read information at one or a number of other locations on the recording medium. The type of optical recording medium is inferred from the success or lack of success of these attempts.

What is disadvantageous about the known apparatus is that a complete set-up operation has to be performed for each attempt to read information. This operation includes, inter alia, the closing of focus regulating circuit, track regulating circuit, drive regulating circuit and the like. This procedure is relatively complicated and time-consuming.

SUMMARY OF THE INVENTION

In a first arrangement an apparatus having an inventive disk type identification means is able, within a short time, to reliably identify the type of the recording medium inserted into the apparatus. A further inventive arrangement specifies a corresponding method for disk type identification.

According to the invention, these objects are achieved by means of the features specified in the independent claims. Advantageous developments thereof are specified in the dependent claims.

According to the invention, the disk type identification means has a mirror signal detector, a threshold value generator, a counter and an evaluation unit. This has the advantage that rapid identification of the type of recording medium is attained. The disk type identification means has elements with a relatively simple function which enable information about the type of disk to be obtained even when the recording medium cannot yet be read even though the focus regulating circuit is closed. The mirror signal is a signal which assumes different values if the scanning means is scanning an information track or a region between two information tracks. In this case, the region located between two information tracks may be free of information, but it may also carry information, for example control information or information of a kind which corresponds to that of the information tracks.

According to the invention, an input of the mirror signal detector is connected to an output of the scanning means and a further input is connected to the threshold value generator, and a counter is connected to an output of the mirror signal detector and to an input of the evaluation unit. In the case of this advantageous combination of the individual elements, the threshold value generator specifies a threshold value for the formation of the mirror signal. The counter counts the occurrence of specific states of the mirror signal, for example the number of high or low states, corresponding transitions, zero crossings or the like. The evaluation unit evaluates the counter reading for the purpose of determining the type of recording medium.

A further advantageous aspect of the invention provides a layer thickness identification means. This advantageous layer thickness identification means supplies an additional criterion by means of which specific settings of the apparatus are suitably preselected to accelerate the identification of the type of disk. In addition or as an alternative, the additional criterion also serves as a criterion for the identification of the type of disk, thereby accelerating the identification or increasing its reliability. The layer thickness identification means serves for determining the thickness of a protective layer which is superposed on an information-carrying layer of the recording medium.

A further aspect of the invention provides for the apparatus to have a spacing identification means for determining the spacing of different layers of the recording medium from one another. This additional criterion also contributes to accelerating and/or to increasing the reliability of the identification of the type of disk. In this case, the various levels are advantageously two or more information layers. However, it is also likewise within the scope of the invention for the layers to be other layers which are present in the structure of the optical recording medium and can be detected.

An inventive method for identifying the type of optical recording medium has the following steps: aa) focusing onto an information layer of the recording medium; bb) setting a threshold value for the generation of a mirror signal; cc) counting transitions of the mirror signal; dd) determining the type of the recording medium using the count. This method has the advantage that a tracking mode and signal identification, for example, by reading of the information stored on the recording medium, are not necessary, which enables the type of disk to be identified rapidly. As soon as the type of recording medium has been identified, apparatus settings which are in accordance with this type of recording medium, in particular focus, tracking and other regulating circuits, are selected. As a result, the start-up phase, for example, the time from the insertion of the recording medium into the apparatus or from the issuing of a start command until the beginning of playback or recording, can be kept short. Consequently, the waiting time for the user is advantageously shortened.

According to the inventive step dd), the recording medium is determined as being associated with an nth type if the count lies in an nth range of values, where n is an integer. This has the advantage that, if appropriate, a multiplicity of different types of recording media can be identified without the counts necessarily having to be exact. In the simplest case a check is made to see whether the count is greater or less than a limit value. This limit value is regarded as the limit between two ranges of values. In the extreme case, a single type of recording medium is identified for example by virtue of the fact that the count is greater than a limit value. For n=2, by way of example, the recording medium is determined as being associated with a first type if the count lies between zero and a first value m1, while it is determined as being associated with a second type if the count lies between a second value m2 and a third value m3. In this case, it is perfectly possible for the start value m0 also to be a value other than zero, or for the first value m1 and second value m2 to be identical. The same applies correspondingly to three or a larger number of disk types to be identified.

A advantageous aspect of the method provides for the scanning beam of the scanning means of the apparatus to be moved across a region of the recording medium which is larger than a region which corresponds to the maximum eccentricity that occurs. This has the advantage that more rapid and more reliable identification is made possible by the large number, achieved as a consequence, of information tracks crossed by the scanning beam. In this case, the eccentricity includes both the production-dictated eccentricity of the recording medium, that is to say the circular or spiral information tracks thereof which are not centred exactly with respect to the axis of rotational symmetry, and eccentricity engendered by operation, for example due to inexact centring of the recording medium in the apparatus. The eccentricity is subject to tolerance ranges which, in practice, are generally not exceeded and which serve here as a lower limit for the induced movement of the scanning beam.

A further advantageous refinement of the invention provides for steps bb) to cc) to be performed a number of times, a different threshold value being set in each case in step bb). This refinement has the advantage that a larger number of different types of disk can be identified relatively rapidly. A further advantage is that, in combination with a plurality of ranges of values, a small number of passes suffices to be able to distinguish a large number of different types. Furthermore, counterchecking by means of different passes makes it possible to increase the checking reliability relatively rapidly.

In addition the invention provides, after the type of recording medium has been determined, for a check to be made to see whether focusing onto a further information layer is possible. This has the advantage that the presence of a multilayer recording medium is detected with apparatus settings which are adapted to the recording medium, which reduces the time that elapses until complete identification of the disk type has ended, and also enables multilayer recording media to be identified.

According to yet a further aspect of the invention, the method according to the invention is first of all utilized for identifying the type of information layer onto which the optical scanning unit effects focusing, then the settings of the apparatus are adapted to the layer type that has been determined, information is read from the said information layer and the type of recording medium is determined from the information read. This method has the advantage that the identification operation is again shortened, since it is not necessary to search for further information layers if the presence and, if appropriate, the type of further layers can be identified from the information read from the first information layer.

An advantageous variant of the invention provides for the mirror signal detector to have at least one element which is variable as a function of frequency. This has the advantage that an element which is variable as a function of frequency can be adaptively matched in terms of its properties to the track crossing frequency during operation, with the result that interfering influences which occur in certain frequency ranges are compensated for or minimized in a frequency-selective manner. The mirror signal detector generates a mirror signal indicating whether the scanning means is scanning a data track or is located between two data tracks. To that end, the high-frequency signal read from the disk is considered. For example if it has a high degree of modulation the scanning means is scanning a data track, whereas it is only weakly modulated if the scanning means is scanning between two data tracks. It is the case at high track crossing frequencies that the differences in modulation between data track and the interspace between two data tracks are only very small. Slightly modulated input signals occur for example in the case of high-density recording media. In that case, when an information track is traversed, the intensity of the high-frequency signal decreases, in some instances, only by 20% in comparison with the traversal of the reflective region lying between the information tracks, whereas this value is approximately 65% in the case of conventional compact discs. The apparatus advantageously has a control device which influences the threshold value-forming unit and also a track regulator. This has the advantage that in order to determine the type of optical recording medium, the track regulator is inactivated and the threshold value-forming unit is set to a fixed threshold value. The effect of switching off the track regulator is that information tracks of the recording medium are traversed. Depending on the type of recording medium, it is possible to establish a mirror signal with regard to a suitably set threshold value or this is not possible, and from this a conclusion is drawn regarding the type of optical recording medium. The averaging is likewise effected as a function of the frequency of the mirror signal. This has the advantage that in the event of a higher-frequency signal, the average value is also formed at a higher frequency in order to be matched as quickly as possible to a possibly altered signal intensity, as occurs e.g. in the case of recording media having a high storage density, as specified above.

Furthermore, provision is made for an upper and a lower threshold value to be used instead of a single threshold value, the mirror signal being set to a first value, for example the value 1, when the upper threshold value is exceeded, and being set to a second value, for example the value 0 when the lower threshold value is undershot, its value otherwise being maintained. This has the advantage that the value of the mirror signal does not fluctuate to an unnecessarily great extent in the transition region between the two values, i.e. becomes smoother. Hysteresis prevents the value of the mirror signal from jumping back and forth in the transition region between the two values. As a result, the frequency determination of the mirror signal also becomes even more accurate and the quality of the method according to the invention is increased.

Yet a further advantageous variant of the inventive method includes specifying a certain threshold value and checking whether or not a mirror signal can be established with regard thereto. This has the advantage that the type of recording medium can be determined by means of a mirror signal detector which is present in any case, i.e. without any additional outlay. If a mirror signal can be established, then a first type of recording medium is being scanned; if, on the other hand, a mirror signal cannot be established, then a second type of recording medium is involved. The different types of recording media differ, for example, in terms of their track arrangement, the size of the track width or of the track spacing, as is the case for example, with conventional CDs and recording media having a high storage density, such as DVDs.

In an advantageous manner a plurality of different threshold values are tested one after the other. This has the advantage of increasing the number of different types of recording media that can be identified. Consequently, types which vary only slightly in terms of their properties can also be distinguished using the mirror signal which can be determined with regard to different threshold values. For example, write-once, write-many and non-writable optical recording media differ, in some instances, only slightly with regard to the threshold value which is suitable for forming the mirror signal, yet they can be identified reliably by means of the method according to the invention on the basis of the plurality of threshold values used. The invention is suitable for distinguishing different types of recording media from one another, such as, inter alia, CD, CD-R, CD-RW and DVD, DVD-RAM and others.

According to the invention, information tracks of the recording medium are traversed during the implementation of the method steps, this being effected in the simplest case by switching off a track regulator and utilizing eccentricity of the recording medium or its mounting in the apparatus. It is particularly advantageous to actively implement traversal of information tracks. This has the advantage that the conditions for generating a mirror signal are always met and, consequently, even an absent mirror signal can be ascribed unambiguously to the type of recording medium.

Further advantages of the invention are evident from the following description of advantageous exemplary embodiments. It is understood that the invention is not restricted to the exemplary embodiments described herein.

DETAILED DESCRIPTION

Figure 1:
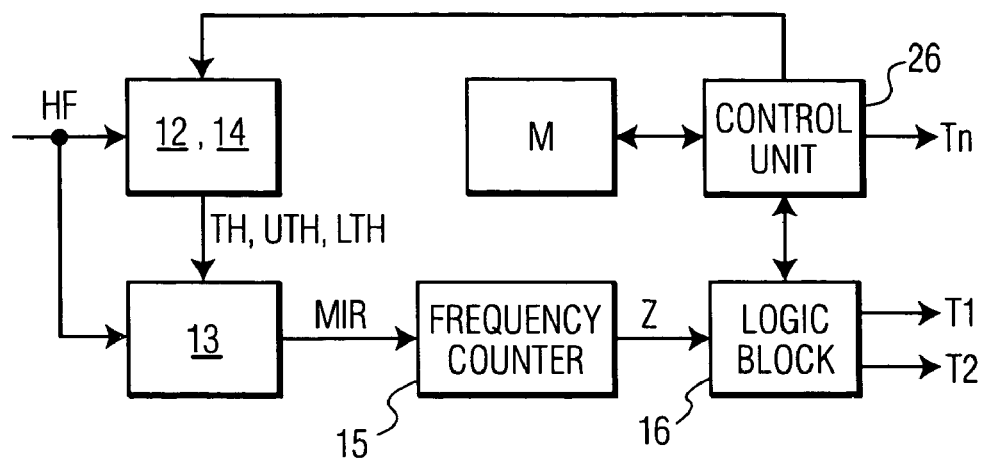
FIG. 1 shows a diagrammatic illustration of an apparatus according to the invention.

FIG. 1 shows a schematic illustration of the disk type identification means of an apparatus according to the invention. A high-frequency data signal HF, which is output by the scanning means 5 (not illustrated here), is fed to a threshold value-forming unit 12, 14 and a mirror signal-forming unit 13. The threshold value-forming unit 12, 14 generates a threshold value TH, which is fed to the mirror signal-forming unit 13. In an advantageous variant, a plurality of threshold values are formed, which are in this case specified as an upper threshold value UTH and a lower threshold value LTH. The mirror signal MIR generated by the mirror signal-forming unit 13 is fed to a counter, which is also referred to as frequency counter 15 in the text below. The functions of the threshold value-forming unit 12, 14 and the mirror signal-forming unit 13 are explained in more detail below.

The frequency counter 15 counts edges (positive in the exemplary embodiment) of the mirror signal MIR and, after a period of time which is determined by an externally prescribed clock signal, forwards the count Z to a logic block 16, which serves as an evaluation unit. A control unit 26 can both receive information from the logic block 16 and forward information to the said logic block. It is connected to a memory M and to the threshold value-forming unit 14. In order to determine the type of recording medium, the control unit 26 specifies to the threshold value-forming unit 14 a threshold value TH to be set. The latter does not generally correspond to the adapted threshold value for the currently inserted recording medium. The consequence of this is that the mirror signal MIR that is generated in response is well performed to a greater or lesser extent, this being manifested for example in the number of countable edges. The count Z then assumes a larger or smaller value.

In the simplest exemplary embodiment, the count Z is compared with a comparison value ml in the logic block 16. If the count lies below the value ml, then the presence of a first type of recording medium, for example a CD, is indicated by means of an output signal T1, while the presence of a second type, for example a DVD, is otherwise indicated. After the type Tn of recording medium has been determined, the specification of the threshold value TH is cancelled and the latter is then adapted, as described further below, for normal operation.

Refinements of the invention provide for the control unit 26 to successively specify different specifications for the threshold value TH to the threshold value-forming unit 14, to evaluate the corresponding output signals of the logic block 16, to thereupon determine a disk type Tn from a multiplicity of disk types and to output a corresponding output signal Tn. The memory M serves for storing specification values, interim results, results or further parameters. The logic block 16 can, as described further below, also perform even further functions.

Figure 2:
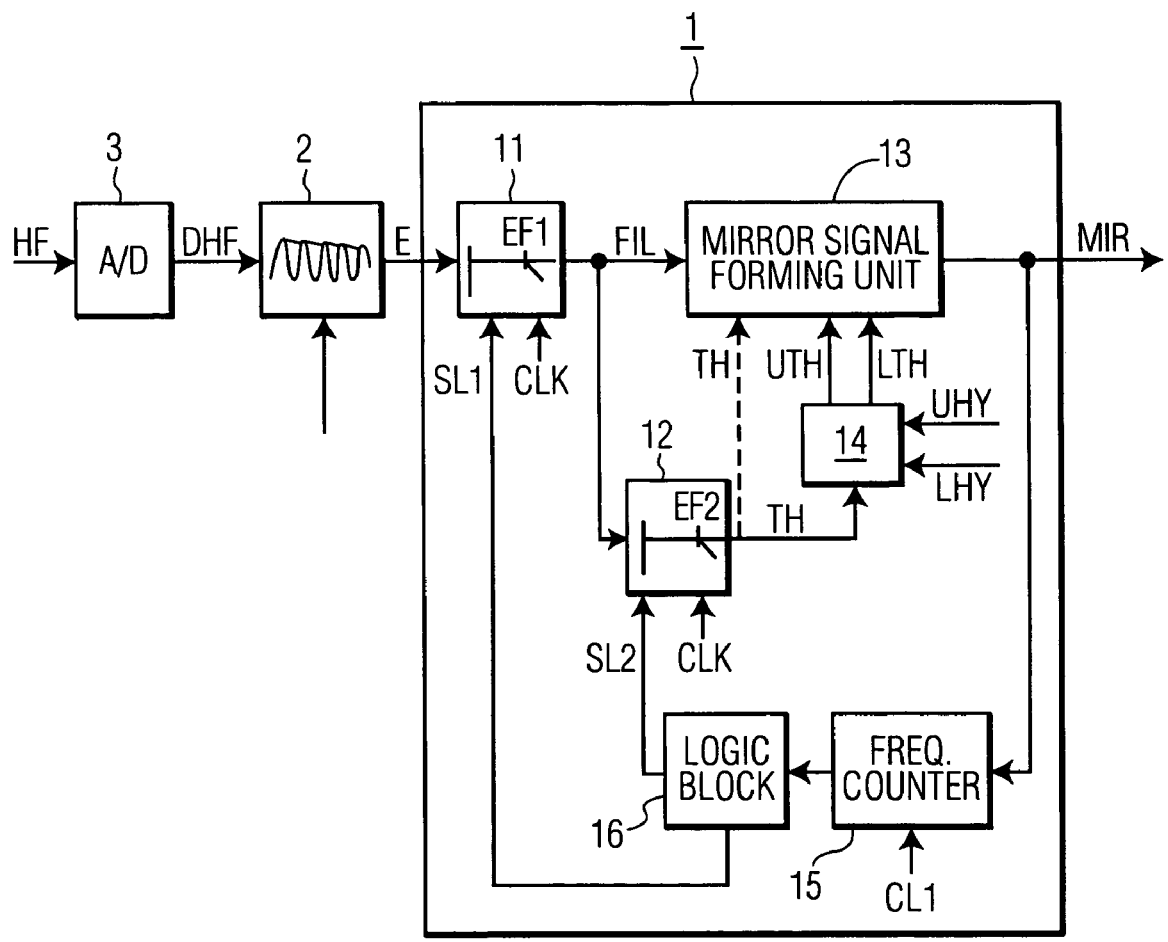
FIG. 2 shows a diagrammatic illustration of an exemplary embodiment of an apparatus according to the invention.

FIG. 2 shows a diagrammatic illustration of a mirror signal detector 1 of an apparatus according to the invention. An envelope signal E is applied to its input and the mirror signal MIR is present at its output. The envelope signal E is generated from a digitized high-frequency DHF by means of an envelope detector 2. In the exemplary embodiment, a peak value detector with a slowly forming hold value is used for this purpose, as is indicated in the block illustration of the envelope detector 2. The high-frequency DHF is generated by means of an analogue-to-digital converter 3, to whose input a high-frequency data signal HF is applied.

Figure 4:
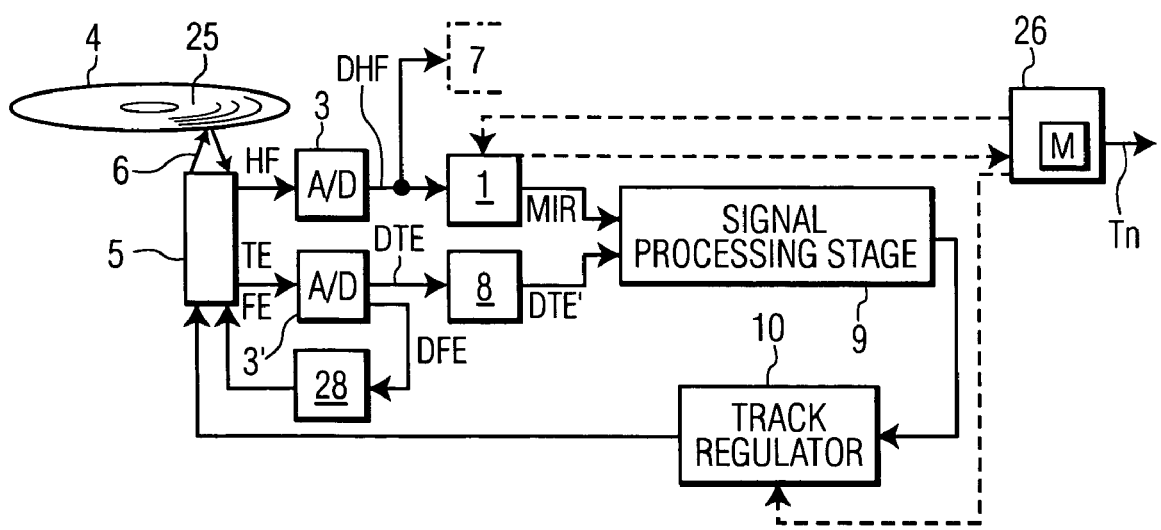
FIG. 4 shows a block diagram of an apparatus according to the invention.

FIG. 4 shows a schematic block diagram of a device according to the invention. An optical recording medium 4, which has diagrammatically indicated, concentrically or spirally arranged information tracks 25, is scanned by means of a light beam 6 generated by a scanning means 5. The light beam 6 is in this case reflected from the optical recording medium 4 and passes to detection elements of the scanning means 5, where it is converted into a data signal HF and into error signals, specified as track error signal TE and focus error signal FE here by way of example, and output by the scanning-means 5. The data signal HF is converted into a digitized high-frequency signal DHF by means of the analogue-to-digital converter 3, which signal is fed to the mirror signal detector 1, on the one hand, and to a demodulation stage 7 (only suggested here), on the other hand. The demodulation stage 7 serves to demodulate the data signal, which is modulated for recording on the recording medium 4, and to output it as audio signal or demodulated data signal. The envelope detector 2 described with regard to FIG. 1 is not illustrated separately in FIG. 4; it is part of the mirror signal detector 1, for example. The track error signal TE and the focus error signal FE are also digitized by means of an analogue-to-digital converter 3', the digitized track error signal DTE is converted into a signal DTE' in a conditioning stage 8 and forwarded to a signal processing stage 9. The latter also receives the mirror signal MIR output by the mirror signal detector 1, logically combines the two signals and outputs a signal to a track regulator 10. The latter forwards an actuating signal to the scanning means 5, in order to displace the latter in the radial direction with regard to the optical recording medium 4. In the event of a normal read-out of the recording medium 4, the radial displacement serves for tracking the light beam 6 on an information track 25 of the optical recording medium 4, whereas in the event of a search operation, the radial movement of the scanning means 5 serves for the traversal of a predetermined number of information tracks 25. The number of tracks traversed may be determined in this case, for example, by counting the positive edges of the mirror signal MIR. The result is used to displace the scanning means 5 correspondingly radially, so that the track sought is reached in the most exact manner possible.

The digitized focus error signal DFE is fed to a focus regulating unit 28, which outputs a signal for driving optical elements of the scanning unit 5 to the latter. This is done in such a way that the light beam 6 is focused onto the information layer of the recording medium 4. According to a variant of the invention, the focus regulating unit 28 has a further function, in a special operating state, of moving the focal point of the light beam 6 in the axial direction of the recording medium 4, and of evaluating the values of the focus error signal FE that occur in the process. The layer thickness of the protective layer which covers the information layer is determined from the presence and the relative spacings and values of maxima in the focus error signal FE. If the recording medium is a multilayer recording medium, the presence and the respective spacing of a plurality of layers from one another are also determined. The focus regulating unit 28 thus serves as layer thickness identification means or as spacing identification means.

The control unit 26, which serves to establish the type of optical recording medium 4, for example CD or DVD, is illustrated diagrammatically as an independent block in this figure. An output of the control unit 26 is connected to the mirror signal detector 1 in order to set a specific threshold value TH, as described further below. A further output of the control unit 26 is connected to the track regulator 10 in order to switch this regulator off or, according to another variant of the invention, in order to control this regulator in such a way that information tracks 25 are actively traversed. An output of the mirror signal detector 1 is connected to an input of the control unit 26. The type of recording medium currently being scanned is established from the signal communicated in this case, if appropriate from a plurality of communicated signals buffer-stored in a memory M.

The individual component parts of the mirror signal detector 1 will now be explained in more detail with reference to FIG. 2. The envelope signal E is fed to a digital low-pass filter 11, the cut-off frequency EF1 of which is variable and is set in accordance with a control signal SL1. In the case of the IIR filter illustrated here, this is implemented in that the system clock signal CLK is divided by a value specified by the control signal SL1 and the frequency that has been reduced in this way produces the operating clock of the digital low-pass filter 11. The lower the operating clock of the low-pass filter 11, the lower, too, is the cut-off frequency EF1 thereof. The output signal FIL of the filter 11 is fed to a mirror signal-forming unit 13 designed as a comparator, for example. According to a first configuration, the mirror signal-forming unit 13 in this case compares the signal FIL with a threshold value TH. If the value of the signal FIL lies above the threshold value TH, then the value of the mirror signal MIR is set to a first value, in this case to 1; if, on the other hand, the value of the signal FIL lies below the threshold value TH, then the mirror signal MIR is set to a second value, in this case to the value 0.

According to a second variant, the mirror signal-forming unit 13 compares the signal FIL with an upper threshold value UTH and a lower threshold value LTH. In this case, the value of the mirror signal MIR is set to 1 if the value of the signal FIL lies above the value of the upper threshold value UTH, and it is set to 0 if the value of the signal FIL lies below the lower threshold value LTH. The value of the mirror signal MIR remains unchanged as long as the value of the signal FIL is between the upper threshold value UTH and the lower threshold value LTH.

One variant consists in keeping the threshold value TH or the upper threshold value UTH and the lower threshold value LTH constant, or not changing them as a function of frequency. It is advantageous, however, to adapt the threshold values TH or UTH and LTH as a function of frequency. A second digital low-pass filter 12 is provided for this purpose, which filter is likewise designed as an IIR filter. As described with regard to the filter 11, the cut-off frequency EF2 of the filter 12 is varied as a function of frequency by reducing the system clock signal CLK by a factor specified by a control signal SL2 to form the operating clock of the filter 12. From the input signal of the filter 12, the signal FIL, an average value free from higher-frequency deviations is formed, by virtue of a suitably selected filter characteristic, and output as threshold value TH. The filter 12 thus acts as an averaging unit. The threshold value TH is fed directly to the mirror signal-forming unit 13 according to the first variant described above, this being illustrated by a dashed line in FIG. 2. It is advantageous, however, to feed the threshold value TH to a threshold value-forming unit 14, which forms the upper threshold value UTH and the lower threshold value LTH from the threshold value TH by means of an upper hysteresis value UHY and a lower hysteresis value LHY, for example by addition or subtraction.

The mirror signal MIR is both output and fed to a frequency counter 15 within the mirror signal detector 1. This frequency counter operates with a fixed clock signal CL1, which can be adapted in a device-specific manner but is constant during operation. In the exemplary embodiment, the frequency counter 15 is designed as an 8-bit counter whose overflow forms the output signal. If the output signal of the frequency counter 15 is to have a higher frequency, then provision is made for outputting the value of the highest or of the second-highest counter bit. Any other bit is also suitable for this purpose, depending on the desired frequency. The output signal of the frequency counter 15 forms the input signal of a logic block 16, which sets the control signals SL1 and SL2 in accordance with its input signal using specified threshold values, in accordance with a specified algorithm, or using a stored table.

The exemplary embodiment described enables a correct mirror signal MIR to be obtained even when an optical recording medium 4 having a high storage density is used, such as a DVD, for example, and in the event of high track crossing frequencies. In this case, the envelope signal E is compared with a threshold value TH in order to generate the mirror signal MIR. Since the envelope signal E is modulated only by about 20% with respect to the maximum value during track crossing in the case of recording media 4 having a high storage density, whereas this figure is about 65% in the case of conventional recording media, such as in the case of a CD, frequency-dependent adaptive filters 11, 12 are provided according to the invention. The frequency dependence in this case begins with a low cut-off frequency EF1, EF2 at the beginning of a track crossing operation in order to suppress high-frequency interfering influences lying, for instance, in the frequency range of the track crossing frequency at a maximum track crossing speed. As the track crossing speed rises, that is to say as the frequency of the mirror signal MIR rises, the cut-off frequency EF1 and/or EF2 is increased in order to allow the frequencies then necessary to pass. Towards the end of the track crossing operation, the cut-off frequency EF1, EF2 is decreased again. In order to take account of the relatively narrow modulation bandwidth of the envelope signal E, which is of the order of magnitude of only 20%, as described, the second low-pass filter 12 is provided for the purpose of forming the threshold value TH, which filter reacts rapidly to changes in the amplitude of the data signal HF and thus of the envelope signal E, which may be caused for example by eccentricity of the recording medium 4, by changes in the reflectivity, or by other interfering influences. The low-pass filter 12 is also adaptable as a function of frequency. The frequency-dependent adaptation of the filters 11, 12 depends on the track crossing frequency, for which reason a measure of this frequency is obtained from the period of the mirror signal MIR. The envelope signal E is generated by means of the envelope detector 2 by detection of the peak value and slow falling, as indicated symbolically.

Figure 3:
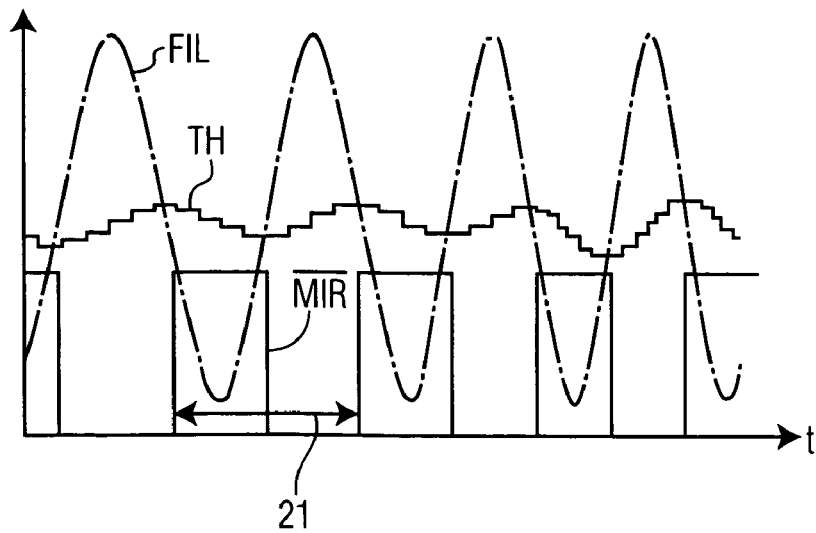
FIG. 3 shows a diagram of typical signals occurring in an apparatus according to the invention.

FIG. 3 illustrates the typical profile of a number of signals occurring in the device according to the invention against the time t. The output signal FIL corresponding to the filtered envelope signal E is free from high-frequency interfering superpositions. The signal of the threshold value TH which is obtained by low-pass filtering is derived from the signal FIL. It is modulated to a lesser extent than the signal FIL and has steps on account of the internal clock of the filter 12. The mirror signal MIR, which is illustrated as inverted mirror signal $\overline{\text{MIR}}$ in FIG. 3, is formed in the mirror signal-forming unit 13 by comparison of the signals FIL and TH. $\overline{\text{MIR}}$ is at a value "high" or 1 when the signal FIL is below the threshold value TH, while the inverted mirror signal $\overline{\text{MIR}}$ is at "low" or the value 0 when the signal FIL is above the threshold value TH. The arrow 21 indicates the period length of the mirror signal MIR, this period length yielding the track crossing frequency which is utilized, in turn, for adaptation of the filters 11 and 12.

The method, employed in the exemplary embodiment, for the frequency-dependent formation of the parameter mirror signal MIR is described with reference to FIG. 2. In a first method step a), the envelope signal E is formed from the data signal HF by means of the envelope detector 2. It is subsequently filtered, in step b), by means of the filter 11 taking account of a cut-off frequency EF1. The filtered envelope signal FIL is then compared, in step c), with a threshold value TH by means of the mirror signal-forming unit 13. The parameter mirror signal MIR is set, in step d), to a first value if the filtered envelope signal FIL lies above the threshold value TH, and to a second value if it lies below the threshold value TH. In step e), the frequency of the mirror signal MIR is determined by means of the frequency counter 15. The value of the cut-off frequency EF1, EF2 is changed as a function of the frequency of the mirror signal MIR in step f). As long as the track crossing operation has not yet concluded, branching to the first step subsequently takes place in step g), otherwise the method is ended. The threshold value TH is formed by averaging the envelope signal E by means of the filter 12. This averaging likewise takes place as a function of the frequency of the mirror signal MIR, in this case by corresponding variation of the control signal SL2. An upper threshold value UTH and a lower threshold value LTH are formed from the threshold value TH by means of the threshold value-forming unit 14. The parameter mirror signal MIR is in this case set to a first value if the filtered envelope signal FIL lies above the upper threshold value UTH, and to a second value if it lies below the lower threshold value LTH, otherwise the preceding value of the parameter mirror signal MIR is maintained.

Figure 5:
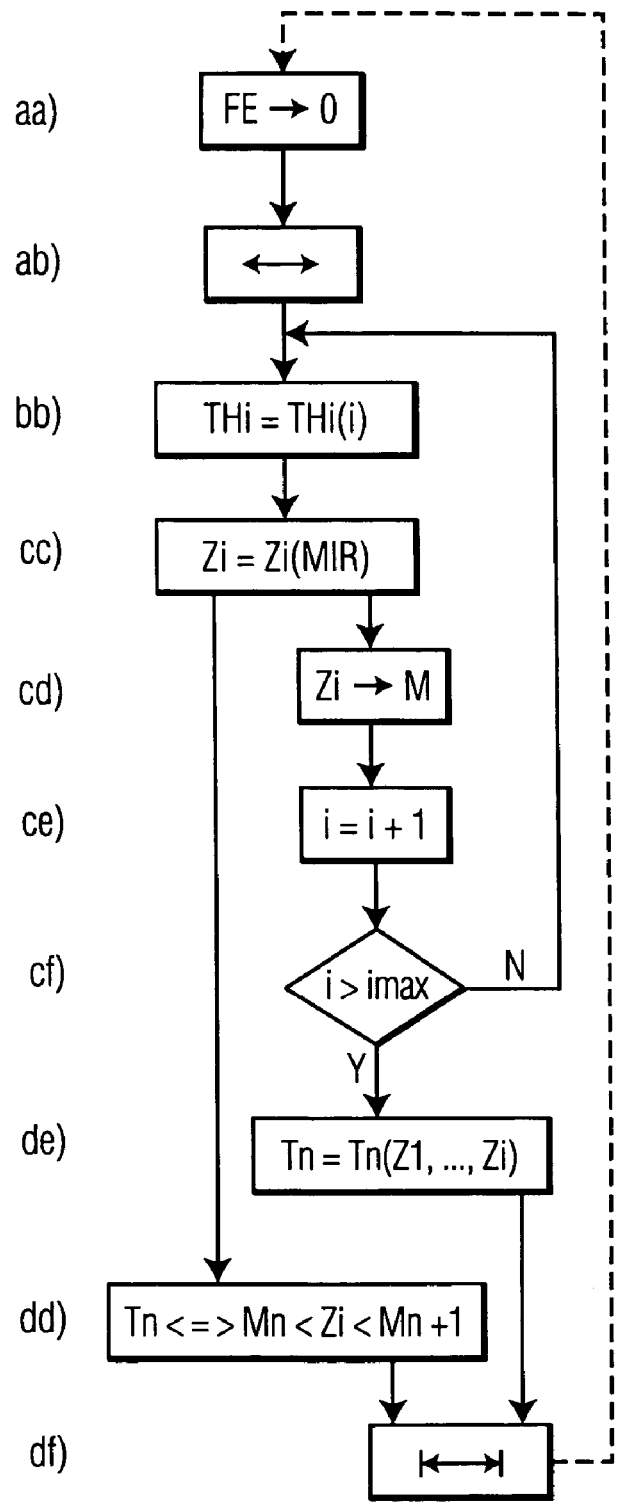
FIG. 5 shows a flow diagram of a method according to the invention.

FIG. 5 represents a flow diagram of an exemplary embodiment of a method according to the invention for identifying the type of an optical recording medium. The principle behind this method consists in utilizing a parameter mirror signal MIR in a device for reading from and/or writing to optical recording media 4. To that end, step aa), first of all focusing onto the information layer of the recording medium 4 is effected. This is done by means of the focus regulating unit 28 in a manner known to the person skilled in the art. In the focused state, the value of the focus error signal is almost zero; the focusing operation is therefore indicated by FE→0 in this case. In step bb), a threshold value TH for forming the mirror signal MIR is specified. According to one variant; provision is made for performing step bb) repeatedly. In this case, a threshold value THi is specified during the ith pass. In the text below, the index i is specified even when repeated performance is not involved. The counter 15 forms a count Zi from the mirror signal MIR formed by means of the threshold value THi. This is specified in step cc). The type Tn of recording medium 4 is determined from the count or the counts Zi in step dd) or de), respectively. In step dd), a simple variant is specified according to which the nth type Tn is involved if the count Zi lies within a range of values bounded by values $m_n$ and $m_{n+1}$. In step de), a more general specification is given by the presence of the nth type Tn can also be defined by the combination of a plurality of counts Zi.

According to a variant of the invention, after step cc), in step cd) the count Zi that has been determined is first of all stored, in step ce) the count i is incremented, and in step cf) the method branches to step bb) as long as a maximum value imax is not exceeded. In this case, the threshold value THi is changed a number of times, corresponding counts Zi are stored and utilized during the concluding performance of step de) for determining the type Tn. A modification provides, after step cc), first of all for a check to be made to see whether a type Tn can be ambiguously determined using the information already present, that is to say first of all for step de) to be executed. Only if it is not yet possible to determine the type does the method then branch to step cd), otherwise the process ends.

A further variant provides, in step df), for identification of the layer thickness of the protective layer covering the information layer, or of separating layers which, if appropriate, separate a plurality of layers of the recording medium 4. The layer thickness determined in the process serves as an additional item of information, which, for the sake of simplicity, is likewise designated as a count Zi, for determining the type Tn in step de). Step df) is preferably coupled to the or with the focusing operation from step aa).

According to a further variant, after step aa) and before step bb), a periodic movement of the scanner 5 in the radial direction is started. This is specified in step ab). The periodic movement is ended as soon as the type of recording medium has been established.

Figure 6:
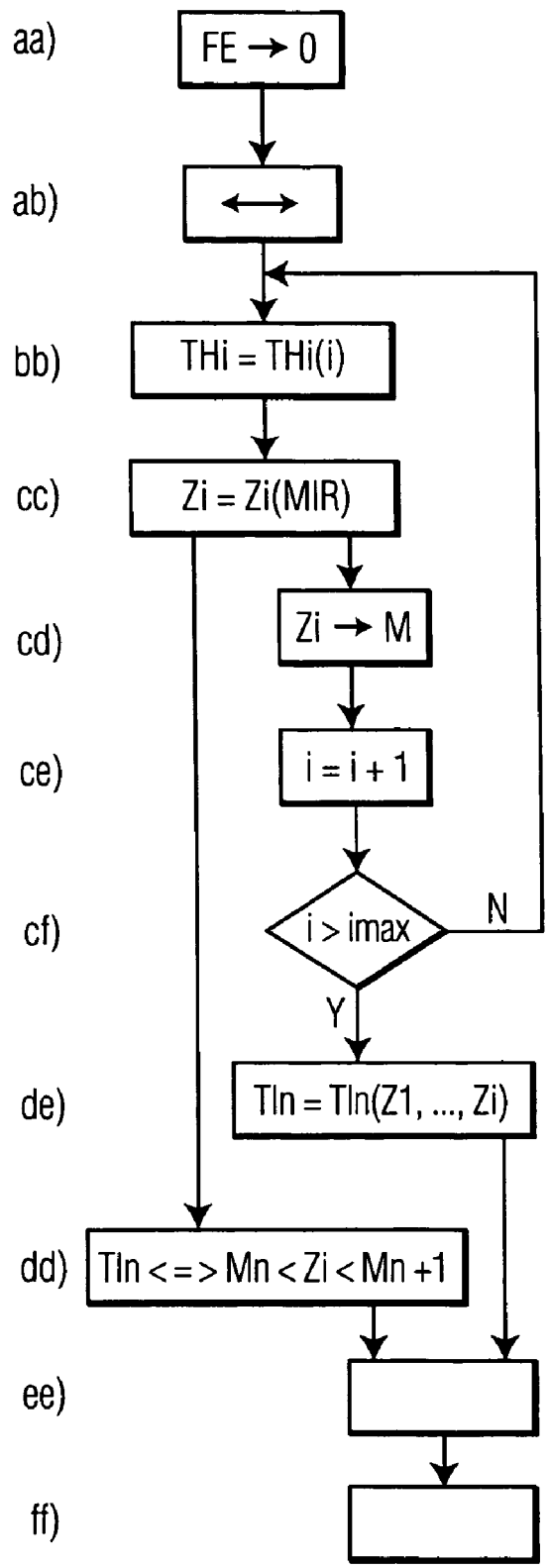
FIG. 6 shows a flow diagram of a variant of the method.

FIG. 6 represents a flow diagram of a further exemplary embodiment of a method according to the invention. In this case, steps aa) to de) correspond to those described with regard to FIG. 5, with the difference that in this case the type TIn of the information layer onto which focusing is detected is determined. Once the type TIn is known, in step ee) the apparatus settings, in particular those for track, focus and other regulating circuits, are adapted to the type TIn of information layer determined. In step ff) information is read from the current information layer and the type Tn of recording medium 4 is determined using the information read and, if appropriate, the type TIn already determined. In general, the type Tn can already be gathered from the information read, otherwise it is determined, for instance using a stored table or a suitable algorithm, from the information read.

Figure 7:
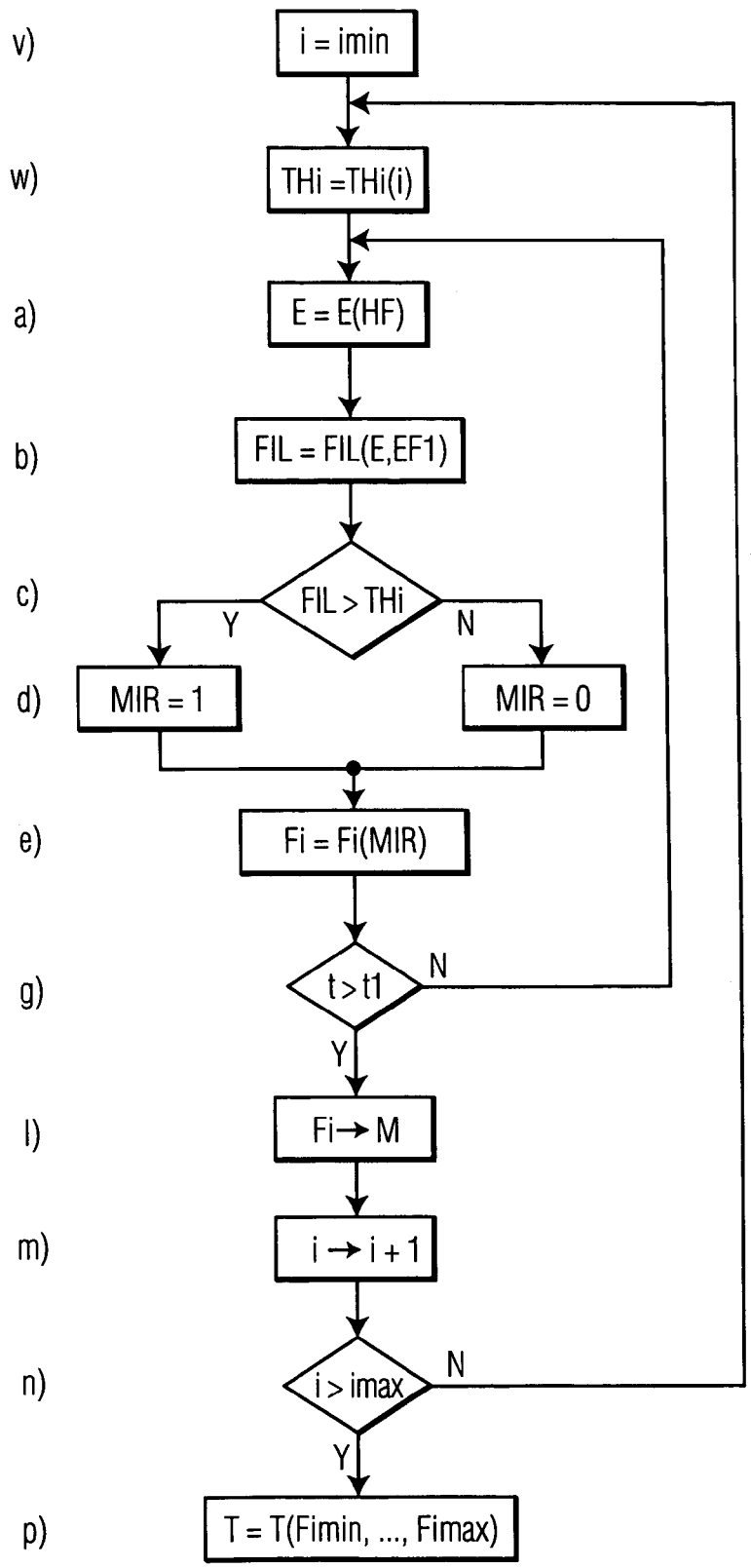
FIG. 7 shows a flow diagram of a further variant of the method.

FIG. 7 represents a flow diagram of an exemplary embodiment of a method according to the invention for identifying the type of an optical recording medium. The principle behind this method consists in utilizing a parameter mirror signal MIR in an apparatus for reading from and/or writing to optical recording media 4. To that end, in step w), a threshold value THi is specified which, in step c) is compared with an output signal FIL derived from the data signal HF, from which the mirror signal MIR is formed in step d). In step e), a check is made to see whether a mirror signal MIR can be formed with regard to the threshold value THi, that is to say whether the value of the mirror signal MIR remains constant or changes with a frequency Fi, which may very well vary. From this information, in the simplest case Fi=0 or Fi≠0, the type of recording medium 4 is determined. In this case, the setting of the threshold value THi is initiated by the control unit 26, which correspondingly drives the threshold value-forming unit 14 of the mirror signal detector 1, receives from the latter the frequency Fi or, as described above, a count Zi and determines the type Tn.

The following method steps are advantageously implemented in addition to the steps described above, but are not all absolutely necessary for the method according to the invention. In step v), a counter value i is set to a start value imin. In the normal case, imin=1, and the count is required only when it is intended to specify more than one threshold value TH. In step w), a threshold value TH is set to a specified threshold value THi in accordance with the count i. Steps a) and b), that is to say the formation of an envelope signal E from the data signal HF and the filtering of the envelope signal E taking account of a cut-off frequency EF1, correspond to the exemplary embodiment described further above. The filtered envelope signal FIL is compared with the threshold value THi in step c), and in step d) the parameter mirror signal MIR is set to a first value, in this case the value 1, if the filtered envelope signal FIL lies above the threshold value THi, and to a second value, in this case the value zero, if it lies below the threshold value THi. The frequency Fi of the mirror signal MIR is determined in step e). Branching to step a) takes place in step g) if a specified first time interval t1 has not yet been exceeded. The time interval t1 is selected such that steps a) to e) are iterated sufficiently to enable a meaningful frequency Fi to be established. The value of the frequency Fi is stored in the memory M in step 1) after the first time interval t1 has been exceeded. This storage operation can be omitted if only a single threshold value THi is used in the method. The incrementing of the counter value i by a specified value, in general by the value 1, in step m) is also necessary only when a plurality of threshold values are used. In step n), branching to step w) is effected as often as until the count i has exceeded a specified end value imax. Subsequently, in step p) the type of recording medium 4 is determined from the frequencies Fi established, it generally sufficing to distinguish between Fi=0 and Fi≠0. The invention guarantees that a mirror signal MIR can always be generated by ensuring that information tracks 25 of the recording medium 4 are traversed at the same time as the implementation of the method steps. For this purpose, the normal tracking regulating mode of the track regulator 10 is inactivated prior to implementation of the first method step v) and is reactivated at the end of the last step p). During implementation of method steps v) to p), the scanning means 5 is driven in such a way that information tracks 25 are traversed, for example by the use of a suitable operating mode of the track regulator 10. To that end, the scanning means 5 is preferably deflected periodically, alternately in the positive and negative directions.

What is claimed is:

1. Apparatus for reading from and/or writing to optical recording media, comprising:
   means for disk type identification including a mirror-signal forming unit and a threshold value forming unit forming at least two of a plurality of possible threshold values;
   an optical scanning means;
   a focus regulating circuit;
   a counter; and,
   an evaluation unit.

2. Apparatus according to claim 1, wherein inputs of the mirror signal-forming unit are connected to an output of the scanning means and to the threshold value-forming unit, and the counter is connected to an output of the mirror signal-forming unit and to an input of the evaluation unit.

3. Apparatus according to claim 1, comprising a layer thickness identification means for determining a thickness of a protective layer covering an information layer of the recording medium.

4. Apparatus according to claim 1, comprising a spacing identification means for determining a spacing between information layers.

5. A method for identifying a type of optical recording medium, comprising the steps of:
   aa) focusing on an information layer of the recording medium;
   bb) applying ones of a plurality of threshold values for the generation of a mirror signal, some of the plurality of threshold values being unsuitable for generating the mirror signal for at least one type of recording medium;
   cc) counting transitions of the mirror signal; and,
   dd) determining a type of recording medium using the count.

6. The method of claim 5, comprising the step of:
   providing at least two ranges of count values respectively associated to different recording medium types.

7. The method of claim 5, wherein said step dd) further comprises:
   determining the recording medium as being of a type when the count value is in a range of values associated with a type.

* * * * *